US007107227B1

(12) United States Patent
Bezos et al.

(10) Patent No.: US 7,107,227 B1
(45) Date of Patent: Sep. 12, 2006

(54) METHOD AND SYSTEM FOR PUBLICIZING COMMERCIAL TRANSACTIONS ON A COMPUTER NETWORK

(75) Inventors: Jeffrey P. Bezos, Seattle, WA (US); Paul Ham, Seattle, WA (US); Michael McDaniel, Seattle, WA (US); Neil Roseman, Seattle, WA (US); Josh Petersen, Seattle, WA (US); Joel R. Spiegel, Woodinville, WA (US)

(73) Assignee: Amazon.com, Inc., Seattle, WA (US)

( * ) Notice: Subject to any disclaimer, the term of this patent is extended or adjusted under 35 U.S.C. 154(b) by 922 days.

(21) Appl. No.: 09/280,867

(22) Filed: Mar. 29, 1999

(51) Int. Cl.
*G06F 17/60* (2006.01)
(52) U.S. Cl. .......................... 705/26; 705/27
(58) Field of Classification Search ................. 705/26, 705/27, 37, 5; 283/67; 379/93.12; G06F 17/60
See application file for complete search history.

(56) References Cited

U.S. PATENT DOCUMENTS

| | | | | |
|---|---|---|---|---|
| 5,890,138 A * | 3/1999 | Godin et al. | ................. | 705/26 |
| 6,023,685 A * | 2/2000 | Brett et al. | ................. | 705/37 |
| 6,131,088 A * | 10/2000 | Hill | ................. | 705/26 |
| 6,216,114 B1 * | 4/2001 | Alaia et al. | ................. | 705/37 |
| 6,230,146 B1 * | 5/2001 | Alaia et al. | ................. | 705/37 |
| 6,856,967 B1 * | 2/2005 | Woolston et al. | ................. | 705/26 |

FOREIGN PATENT DOCUMENTS

WO    WO0016210    *    3/2000

WO    WO200062223 A1 *    10/2000

OTHER PUBLICATIONS

Smith, Going . . . gone. (auctions on the Web), PC Week, v13, n34, p. E1(2), Aug. 26, 1996.*
From http://www.circuitcity.com/, Circuit City Product Detail, wherein "Required Accessories" & "Recommended Accessories" are displayed (a total of 15 pages), copyright 1996-2002.*
From http://www.eCOST.com/ (a subsidiary of a company founded in 1987), Thousands of products at great prices!, wherein "Check for Add-ons" are recommended & displayed.*
From http://www.archives.org/, Internet archive wayback machine for ebay.com (7 pages).*
Tervenn et al., Phoaks: A system for sharing recommendations, Communications of the ACM v40n3 pp. 59-62, Mar. 1997 (Dialog (R) file 15 01378972).*
Wiley, Beyond information retrieval, Database v21n4 pp. 18-22 Aug./Sep. 1998 (Dialog(R) file 15 01676490).*

(Continued)

*Primary Examiner*—Cuong Nguyen
(74) *Attorney, Agent, or Firm*—Perkins Coie LLP

(57) ABSTRACT

A computer method and system for publicizing commercial transactions. To publicize a commercial transaction, the system ("e-commerce system") receives a selection of a purchase transaction for a first item. The e-commerce system identifies an auction for a second item such that the second item is related to the first item. For example, the first item may be a kayak, and the second item may be a kayak cover. The e-commerce system then generates a display description (e.g., web page) that includes information for conducting the purchase transaction for the first item and that includes information relating to the auction for the second item. In this way, a user who views information relating to the purchase transaction can also view information relating to the auction.

43 Claims, 12 Drawing Sheets

OTHER PUBLICATIONS

Rapoza, Alexa's theory of relativity, PC Week, v. 14 n35 p. 42(1) Aug. 18, 1997 (Dialog(R) file 256 00102870).*

From Dialog(R) file 275 02062671, Likeminds tailors its personal recommendation software at web sites and data mining, Computergram International, n3158, p. CGN05120014.* eBay Inc., ebay—The world's online market place, copyrighted 1995-2001, 10 pages.*

Robbin Zeff and Brad Aronson, "Advertising on the Internet", Second Edition, Wiley Computer Publishing, 1999, Chapter 2, "Online Ad Models," pp. 23-68; Chapter 5, "Ad Management," pp. 121-131.

Wiley, Deborah Lynne, "Beyond Information Retrieval," Database; Weston, Aug./Sep. 1998 (8 pages).

* cited by examiner

AUCTION IT

CATEGORY HEIRARCHY
  SPORTING GOODS
    WATER SPORTS — 301
      BOATS
        KAYAK

ENTER NAME ITEM: | WHITEWATER KAYAK COVER | — 302

ENTER DESCRIPTION OF ITEM: | KNITTED KAYAK OR CANOE COVER | — 303

START BIDDING: 4/20/99    END BIDDING: 4/22/99 — 304

⋮

ENTER KEYWORDS FOR ADVERTISING AUCTION:
| KAYAK, CANOE, KAYAK COVER, WHITEWATER KAYAK, | — 305

ENTER CATEGORIES FOR ADVERTISING AUCTION:
| | — 306

ENTER ITEM ID'S FOR ADVERTISING AUCTION:
| | — 307

*Fig. 3*

WHITEWATER KAYAK COVER
SALE & AUCTION ITEMS

| PHOTO | TITLE | SOURCE | TYPE | BID/PRICE | HIGH BIDDER | BIDS | CLOSE |
|---|---|---|---|---|---|---|---|
| 📷 | WHITEWATER KAYAK COVER | BUY IT NOW | | $75.00 | | | |
| | WHITEWATER KAYAK COVER | NETMARKET | SHOP THE WEB | $70.00 | | | |
| | KAYAK COVER | WHITEWATER | FOR SALE | $75.00 | | | |
| | WHITEWATER KAYAK COVER NEW | JONES | AUCTION | $35.00 | SMITH | 5 | 2 DAYS |

WANTED

| PHOTO | TITLE | BUYER | TYPE | LOW BID/PRICE | HIGH BIDDER | BIDS | CLOSES |
|---|---|---|---|---|---|---|---|
| | WHITEWATER KAYAK COVER IN BOX | ACME SPORTS | REVERSE AUCTION | $35.00 | | | 3 DAYS |
| | WHITEWATER COVER | ADAMS | CLASSIFIED | $40.00 | | | |
| | WHITEWATER KAYAK COVER | JONES | REVERSE AUCTION | $25.00 | WILSON | 5 | 2 DAYS |

*Fig. 4*

BOAT TABLE — 700, 701

| BOAT TYPE | MANUFACTURER | DESCRIPTION | ITEM ID | KEYWORDS | PRICE | SIMILARITY |
|---|---|---|---|---|---|---|
| ROW | ACME | 6 FT LONG, GREY, ... | 8527 | ROW, BOAT, DINGHY | $325.00 | 6214, 6358 |
| KAYAK | WHITEWATER | 12 FT LONG, BLUE, ... | 8451 | KAYAK, CANOE, | $500.00 | 6014 |
| ... | | | | | | |
| KAYAK | TSUNAMI | 8 FT LONG, PADDLES ... | 7138 | KAYAK, CANOE | $425.00 | 3215, 3804 |

Fig. 7

METHOD AND SYSTEM FOR PUBLICIZING COMMERCIAL TRANSACTIONS ON A COMPUTER NETWORK

TECHNICAL FIELD

The present invention relates a generally to conducting electronic commerce, and more particularly, to publicizing commercial transactions on a computer network.

BACKGROUND OF THE INVENTION

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system and schedules shipment of the items.

The World Wide Web is also being used to conduct other types of commercial transactions. For example, some server computer systems have been developed to support the conducting of auctions electronically and other server computer systems have been developed to support a buying service where a user lists an item that the user wants to purchase and specifies the purchase price. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction. To purchase an item using a buying service, the user identifies the item (e.g., an airline ticket) and a price that they are willing to pay for the item via a web page to a server computer system. The server computer system contacts potential sellers to see if they are willing to sell the item for that price. If a seller is found, the server computer system notifies the buyer and may automatically charge an account of the buyer.

Because of the vast number of server computer systems that support conducting electronic commerce of one type or another, it is difficult for a user to locate all the information needed to make a fully informed buy or sell decision. For example, a buyer may want to purchase an item that is being sold or auctioned at several server computer systems. It would be helpful to have a system that would facilitate the dissemination of information needed to make more fully informed buy and sell decisions.

SUMMARY OF THE INVENTION

Some embodiments of the present invention provide a computer method and system for publicizing a commercial transaction for one item with commercial transactions for targeted items in a process referred to as "targeted item advertising." To provide targeted item advertising for a commercial transaction, the system ("e-commerce system") allows a user to define the commercial transaction to be advertised. For example, the commercial transaction can be the auctioning of an item. When the commercial transaction is being defined, the e-commerce system allows the user to select various categories of targeted items or particular targeted items. The user may select a category of items by browsing through a category hierarchy and may selected a particular targeted item by entering a unique identifier (e.g., stock keeping unit ("SKU")) of the targeted item. When a commercial transaction is conducted relating to a targeted item, then the commercial transaction defined by the user is advertised. For example, when the e-commerce system generates a web page for the sale of a targeted item, then the e-commerce system includes on that web page an advertisement for the auction defined by the user. Alternatively, the e-commerce system may automatically select targeted categories or targeted items. This automatic selection can be based on analysis of purchasing patterns of buyers. This automatic selection can also be based on keywords entered by a user. Targeted item advertising allows for more effective advertising because the user defining a commercial transaction for an item can specifically target items with which the commercial transaction is to be advertised.

In another aspect of the present invention, the e-commerce system generates a combined display description that contains links to various different types of commercial transactions for an item. For example, the e-commerce system may include links to web pages for items that are to be sold at a fixed price and for items that are to be auctioned. To generate the display description, the e-commerce system receives an identification of an item (e.g., kayak). The e-commerce system then retrieves information describing a first type of commercial transaction (e.g., fixed price sale) for the identified item and then retrieves information describing a second type of commercial transaction (e.g., auction) for the identified item. The e-commerce system then generates a display description that includes retrieved information describing the first type of commercial transaction for the identified item (e.g., a URL to a web page for conducting the first type of commercial transaction for the identified item) and includes retrieved information describing the second type of commercial transaction for the identified item. The e-commerce system may use a common category hierarchy of items to identify both types of commercial transactions for an item, may use information stored by target item advertising to identify commercial transactions, or may use the unique identifiers of the items that are the subject of the commercial transactions. In this way, a user is made aware of different types of commercial transactions for an item and can engage in the most appropriate type of commercial transaction relating to the item.

BRIEF DESCRIPTION OF THE DRAWINGS

FIG. 3 is a block diagram illustrating an example setup auction web page.

FIG. 4 is a block diagram illustrating an example integrated web page that displays links to various commercial transactions for an item.

FIG. 7 is a diagram illustrating a example table containing information describing various items that are for sale.

DETAILED DESCRIPTION OF THE INVENTION

Figure 1:
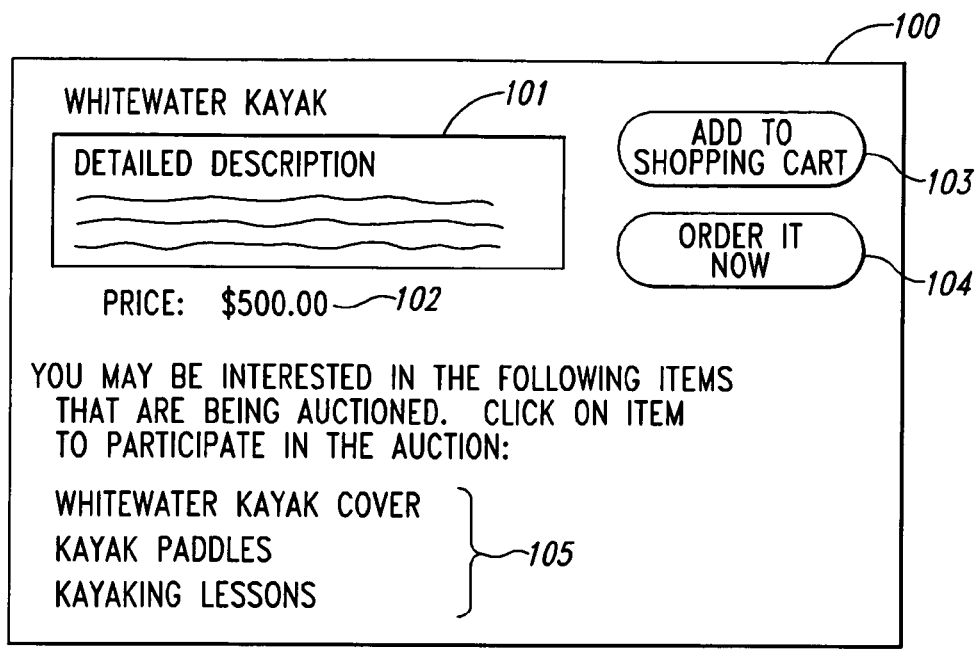
FIG. 1 is a block diagram illustrating an example purchase web page that includes links to related-item auctions.

Embodiments of the present invention provide an e-commerce method and system that provide a central access point through which different types commercial transactions relating to an item can be viewed and accessed and that provide various techniques for advertising commercial transactions for related items. The term "commercial transaction" encompasses transactions such as a sale of an item, an auction of an item, the reverse auction of an item (where sellers bid increasingly lower prices until a buyer buys the item), the licensing of an item, bartering of an item, and any transaction involving transfer of rights to an item. The term "item" refers to any product, service, or combination of product and service or, more generally, to any exchangeable entity.

In one embodiment, the e-commerce system of the present invention provides a WWW-based system for conducting commercial transactions. The e-commerce system is implemented as a web server that provides web pages for conducting various types of commercial transactions for items. The e-commerce system may provide web pages for retail purchasing of an item and for auctioning an item. To purchase an item, the user selects the appropriate purchase web page that may contain a description of the item, the purchase price of the item, and instructions on how to place an order for the item (e.g., add the item to a shopping cart and proceed to check out). To bid for an item that is being auctioned, the user selects the appropriate auction web page that contains information describing the item and the bidding history of the item. The user then enters a bid amount for the item.

The e-commerce system provides an integrated web page through which a user can view different types of commercial transactions that relate to an item, such as fixed price sales or auctions of related items. In particular, when a user selects an item by, for example, browsing a catalog of items or by submitting a query, the e-commerce system locates information describing the various commercial transactions relating to that item and generates a web page that describes those commercial transactions. When the web page is displayed to the user, the user can view the different types of commercial transactions and make an informed decision as to which type of commercial transaction is most appropriate. For example, the integrated web page may display an indication that a new item (e.g., a new kayak) is being offered for sale, an indication that a used item (e.g., a used kayak) is being offered for sale, and an indication that a used item is being auctioned. Depending on whether the user needs a new item or whether the user can wait until an auction completes, the user can decide to participate in any one or more of the commercial transactions. The integrated web page contains a link to each of the web pages that support the commercial transactions. In this way, the user can quickly view more detailed information relating to the commercial transactions and start participating in the commercial transactions. Because these commercial transactions are provided through a central access point (e.g., an integrated web page), it is easier for a user to make more fully informed buy and sell decisions, and the commercial transactions are more widely publicized.

In one aspect of the present invention, the e-commerce system allows transactions for items with or without unique identifiers to be cross-advertised with transactions for items that have unique identifiers. A user can locate the unique identifiers of items by browsing a hierarchical organization of items, by reviewing an electronic catalog of items, by submitting a search query, or by finding out about a unique identifier in some other way, such as by word-of-mouth. Once a user locates a unique identifier, the user can specify that a transaction for a certain item is to be cross-advertised with transactions for items with that unique identifier. Thus, the e-commerce system allows dynamic sales (e.g., auctions) to be advertised with the retail sale of items in a catalog which can be uniquely identified.

The e-commerce system of the present invention places, on a commercial transaction web page for an item, advertisements (e.g., links to a web page) for different types of commercial transactions of related items. For example, the e-commerce system when generating a purchase web page for an item may include information describing auctions of related items and may also include links to the auction web pages. Thus, a potential buyer of the item will become aware of the related commercial transactions. Such displaying of related-item commercial transactions may help the buyer to make a more informed decision and may help a seller to reach more potential buyers. In one embodiment, the e-commerce system may allow the user to enter unique identifiers of items (e.g., stock keeping unit ("SKU")) to ensure that the commercial transaction is advertised with particular items. For example, the user may enter the SKUs of a kayak to ensure that an auction for the kayak is advertised on purchase web pages or other auction web pages for that kayak. In an alternate embodiment, the e-commerce system allows sellers or buyers of items to specify keywords or categories of the items that are used to identify commercial transactions for related items. For example, a when a user is auctioning a kayak, the user may enter the keywords of "kayak" and "paddles" so that the auction can be advertised with web pages for conducting commercial transactions relating to kayak paddles. The user may also enter the category of "boats" so that the auction can be advertised with web pages for conducting commercial transactions relating to boats. The e-commerce system also may automatically determine whether commercial transactions are related. The e-commerce system may determine that commercial transactions are related based on the categories of their items. For example, kayaks and kayak cover may both be in a boat category and thus may be related. The e-commerce system may also determine that commercial transactions are related by analyzing descriptions of the items by, for example, identifying keywords in the descriptions and titles. The e-commerce system may also determine that items are related based on their "similarity." The similarity of items is high when, for example, users may purchase both items at the same time or may look at purchase web pages for both items within a certain time period.

The e-commerce system may provide advertising and integrated web pages for commercial transactions conducted on many other servers. For example, if the e-commerce system supports primarily the retail sale of items, it may collect auction information from other servers that support primarily auctions. The e-commerce system can collect the information from other servers in several ways. For example, the e-commerce system can use a web crawler to visit various servers and identify web pages for commercial transactions and the items that are the subject of the commercial transactions. Such web crawling may perform a semantic analysis of arbitrarily formatted web pages to help with the identifications. Alternatively, the e-commerce system may be customized to the particular format and layout of the web pages of a certain server so that the web pages and items can be more accurately and quickly identified. In another embodiment, web pages that support commercial transactions may include hidden information in a predefined format that describes the commercial transaction. The e-commerce system can then visit these web pages and retrieve the hidden information. In this way, the e-commerce system can identify the commercial transactions without the overhead of customization and without semantic analysis. In still another embodiment, the e-commerce system can download files from other servers that describe the commercial transactions. Regardless of how the information on the commercial transactions is collected, the e-commerce system may store the information in a database so that it can be rapidly retrieved when web pages are generated.

The e-commerce system may also expand the definition of a "related" item when no or few commercial transactions are located for closely related items. For example, if no commercial transactions are found for items that are in the same category as an item being sold, then the e-commerce system may search the next higher category for commercial transactions and so on until a commercial transaction is located. Searches for commercial transactions of related items that are based on keywords and similarity can also be expanded by, for example, using more generic keywords and using items that are similar to similar items. The definition of related items can also be expanded to include items in related categories and items similar to items in related categories and then to items in related categories of those similar items and so on. For example, if item A is related to item B based on similar purchase behavior and item C is related to item B because of similar purchase behavior, then item A and item C may be considered to be related. Also, if item D is related to item B because they are in related categories, then item A and item D may be considered to be related. Also, if item E is related to item D because they are in related categories, then items A and E and items B and E may be considered to be related.

The e-commerce system may also provide a filtering mechanism to ensure the reasonableness of cross-advertisements. For example, a seller of an auction item that is a kayak may want to advertise the auction as broadly as possible. Therefore, the seller may specify that the kayak should be cross-advertised with a book that is unrelated to kayaks but is on a best seller list. In this way, the seller maximizes the advertisements audience. Potential buyers of that best seller book would likely be annoyed to see advertisements to unrelated items. To prevent annoying such potential buyers, the filtering mechanism can ensure that a transaction for an item is cross-advertised only with transactions for a related item. This filtering can be performed in various ways. If a unique identifier or at least a general category of the item for the transaction that is being cross-advertised can be determined, then the filtering mechanism can compare how closely the items are in a category hierarchy. For example, if the items are have a common category that is two levels up, then the cross-advertisement may be reasonable. If, however, the lowest common category is 10 levels up, then the cross-advertisement may be unreasonable. If a unique identifier or category cannot be determined, then the filtering mechanism identifies key words from a description of the item for the transaction being cross-advertised. The filtering mechanism uses the identified key words to determine the reasonableness of the cross-advertising. Alternately, the filtering mechanism bases the reasonableness determination on an analysis of access patterns of users. For example, if many users who buy kayaks also buy or at least access web pages advertising marine phones, then the cross-advertising may be reasonable.

The e-commerce system may also allow a catalog of items to grow as transactions for items not in the catalog are defined. When a user defines an auction for certain item that is not in the catalog, the e-commerce system prompt the user for information to fully specify the categories of the item and then assigns a unique identifier to the item. In subsequent transactions of that item, the users can locate the unique identifier for that item. Because the item has a unique identifier, the e-commerce system can collect statistical information relating to those transactions. As the catalog grows, the e-commerce system can provide users with more useful information on more and more items. Also, the e-commerce system can allow cross-advertising between auctions for related items. That is, when a seller lists an item to be auctioned, the user can specify the unique identifier of a targeted item and indicate that the auctions are to be cross-advertised on auctions of those targeted items. The e-commerce system can also allow cross-advertising of auctions based on the categories of the items even though unique identifiers have not be defined for the items.

The e-commerce system may collect information about auctions that a user participates in, or at least expresses an interest in by, for example, accessing a web page for the auction. The e-commerce system can analyze this information to determine which auctions may be of interest to the user. The e-commerce system can then recommend to the user those auctions that may be of interest. If the e-commerce system has not, however, collected enough information to determine which auctions may be of interest to the user, then the e-commerce system may determine auctions that may be of interest by analyzing the user's access patterns to a catalog of items that are for sale. In particular, based on the access patterns, the e-commerce system can determine those items in the catalog that may be of interest to the user. An auction may be of interest when it is cross-advertised with any of those items or when it is for an item in a category that is related to the categories of any of those items. The e-commerce system can recommend such auctions to the user. Even if the e-commerce system has enough auction access information to make a recommendation, it may use the catalog access patterns to supplement the recommendation.

Items for sale through a catalog at a fixed sale price may have a different category hierarchy from the category hierarchy of items being auctioned. Such differences may occur, for example, when the category hierarchies are defined by different organizations. In one embodiment, the e-commerce system is provided with a mapping between categories in the different category hierarchies. The e-commerce can use this mapping to determine the corresponding or analogous categories in the different category hierarchies. For example, the category hierarchy for a catalog of items that are for sale at a fixed price may have lowest categories named "kayak covers" and "kayak paddles," and a category hierarchy for auctions may have a lowest category named "kayak accessories." The provided mapping may indicate that the "kayak covers" and "kayak paddles" categories may map to the "kayak accessories" category.

FIG. 1 is a block diagram illustrating an example purchase web page that includes links to auctions of related items. The purchase web page 100 includes a detailed description of the item 101, a price field 102, an add-to-shopping-cart button 103, an order-it-now button 104, and related-item auction links 105. In this example, a Whitewater kayak has been selected by the user and detailed information relating to the kayak is displayed. If the user decides to purchase the kayak, the user can add it to a shopping cart using the add-to-shopping-cart button. Alternatively, the user can place the order immediately by selecting the order-it-now button. The e-commerce system also displays links to auctions for related items (and possibly to classified advertisements to sell related items) both to assist the buyer in purchasing related items and to advertise the auctions for the sellers. When the e-commerce system generates the purchase web page, it identifies auctions that are related to the item. In this example, the e-commerce system identified that auctions relating to a Whitewater kayak cover, kayak paddles, and kayaking lessons were related. The e-commerce system adds to the purchase web page links for each of these auctions. The user can then select one of the links to visit an auction web page. The links can also be links to web pages that contain multiple links to commercial transaction web pages.

Figure 2:
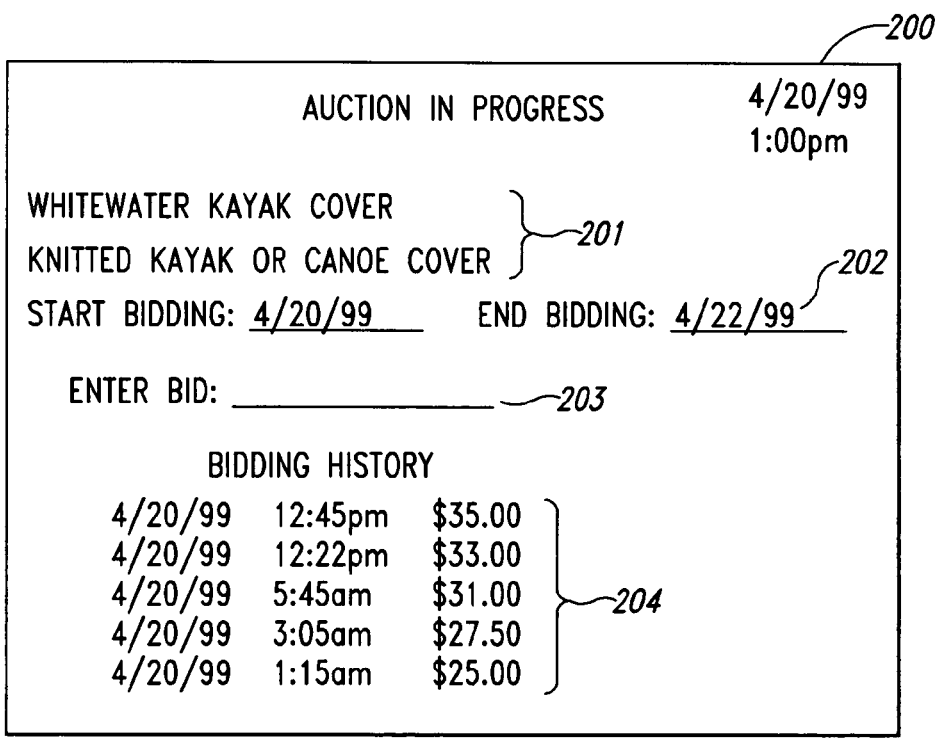
FIG. 2 is a block diagram illustrating an example auction web page.

FIG. 2 is a block diagram illustrating an example auction web page. The auction web page 200 identifies the item being auctioned 201, the bidding period 202, and the bidding history 204. The web page also contains a bid field 203 in which the user may enter a bid for the item being auctioned. In this example, a Whitewater kayak cover is being auctioned. The bidding for the auction started on Apr. 20, 1999 and ends on Apr. 22, 1999. The bidding period may also have an associated start time of day and end time of day. The bidding history indicates that five bids have already been placed to purchase the kayak cover. The highest bid is $35. The "Whitewater kayak cover" link of FIG. 1 points to this auction web page.

FIG. 3 is a block diagram illustrating an example setup auction web page. A setup auction web page is used by the seller of an item to create the auction. The web page 300 contains a category hierarchy 301, a name field 302, a description field 303, and a bidding period 304. The setup auction web page also includes a keyword field 305, a category field 306, and an item ID field that are used to determine where to advertise the auction. The category hierarchy lists a hierarchy of categories that contain the item being auctioned. In this example, the item being auctioned is a Whitewater kayak cover. The Whitewater kayak cover is in the categories of sporting goods, water sports, boats, and finally kayak. When setting up an auction, the user browses through the category hierarchy to select the category of the item being auctioned. The user then enters the name of the item in the name field. Alternatively, if the item has an SKU, the user may enter the SKU in the name field. The user may enter a description of the item being auctioned in the description field. The user may specify the time at which the bidding is to start and end. Alternatively, the bidding period can default to a predefined period (e.g., 24 hours). The user may also enter various data indicating where the auction is to be advertised. For example, the user may enter related keywords in the keyword field. The e-commerce system uses these keywords to find related-item auctions when generating a purchase web page for an item. Because the seller has entered the word "canoe" in the keyword field, when a purchase web page for a canoe is generated, the e-commerce system may add a link to this auction. The seller may also enter the specific categories in which the auction is to be advertised. For example, the seller may specify the canoe sub-category within the boats category. When the e-commerce system generates commercial transaction web pages for items in these categories, it may include a link to this auction. To specify more targeted advertising, the seller may also enter the item IDs (e.g., SKU) of items with which this auction should be advertised. For example, the seller may enter the item ID of a Whitewater kayak, and the e-commerce system may then add links to this auction to any commercial transaction (web pages) for a Whitewater kayak. One skilled in the art would appreciate that the e-commerce system may use any combination of the keyword, category, and item ID fields. The e-commerce system may also automatically determine where to advertise the item to be auctioned. For example, the e-commerce system may analyze the description field to select keywords. Also, the e-commerce system may advertise the auction based on the category hierarchy.

FIG. 4 is a block diagram illustrating an example integrated web page that displays links to various commercial transactions for an item. The integrated web page 400 includes a sale and auction items section 401 and a wanted items section 406. The sale and auction items section contains information, including links, describing commercial transactions through which the item may be sold or auctioned. The information may include a link to a photograph of the item being offered, a link to the commercial transaction web page for the item, the type of the commercial transaction (e.g., auction or sale), the price or current high bid, and other auction-related information. The sale and auction items section of this example contains entries for four commercial transactions. The first entry 402 corresponds to retail purchase transaction of a Whitewater kayak cover at the price of $75. The source and type columns contain a buy-it-now button. When a user selects the buy-it-now button, an order is automatically placed. When the buy-it-now button is selected, the e-commerce system uses single-action ordering technology to generate an order for the item. The single-action ordering technology is described in U.S. patent application Ser. No. 08/928,951, entitled "Method and System for Placing an Order Via a Communications Network," which is hereby incorporated by reference. Entries 403 and 404 correspond to other purchase transactions for a Whitewater kayak cover. Entry 405 corresponds to an auction for a Whitewater kayak cover. As indicated by the entry, the current high bid price is $35. The wanted items section corresponds to wanted-item transactions where a user advertises a willingness to purchase the item. In this example, entries 407 and 409 correspond to reverse auction transactions for a Whitewater kayak cover. A "reverse auction" is an auction in which potential sellers bid against each other to sell an item by lowering the selling price of the item. Entry 408 corresponds to an offer to purchase the item at the price of $40. Although the integrated web page is described as containing information on different types of commercial transactions for the same item (e.g., a Whitewater kayak), in some embodiments the web page may contain information for fungible items (e.g., a Whitewater kayak and a Tsunami kayak) or related items.

Figure 5:
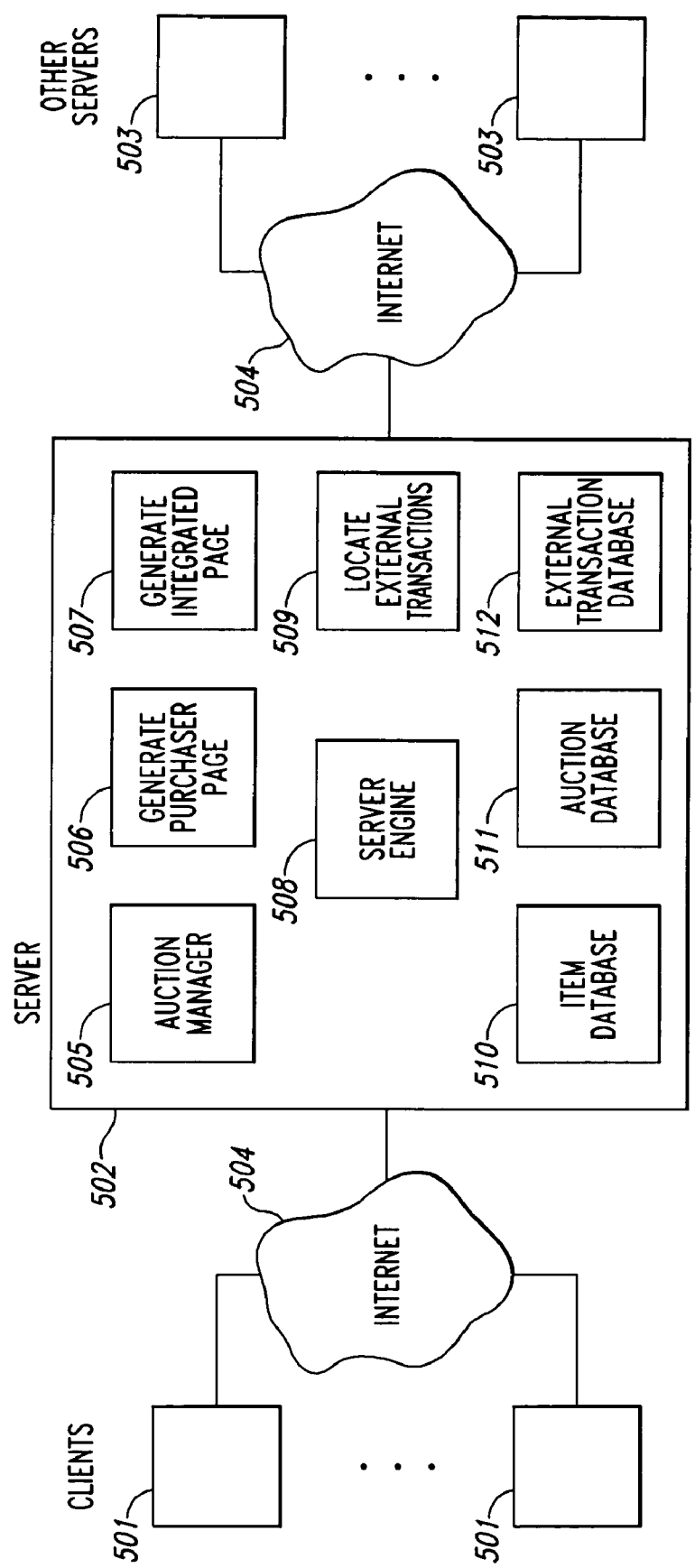
FIG. 5 is a block diagram illustrating the components of an e-commerce system.

FIG. 5 is a block diagram illustrating the components of an e-commerce system. The client computers 501, the server computer 502, and the other server computers 503 are interconnected via the Internet 504. The client computers use a browser to access the various web pages via the Internet. The other server computers support purchase, auction, and wanted-item transactions. The server computer implements the e-commerce system of the present invention. The server computer includes an auction manager component 505, a generate purchase page component 506, a generate integrated page component 507, a server engine 508, a locate external transactions component 509, an item database 510, an auction database 511, and an external transaction database 512. The e-commerce system may also support wanted-item transactions. The auction manager component controls the creating, the bidding, and the closing of auctions. The auction manager component stores the information relating to auctions in the auction database. The generate purchase page component accesses the item database to generate a purchase web page for an item to be sold. The generate purchase page component also accesses the auction database to determine whether any related-item auctions have been created for the item being sold. If so, the generate purchase page component adds links to those auctions on the purchase web page. The generate integrated page component generates an integrated web page that includes links to various same-item transactions such as purchase, auction, and wanted-item transactions for the item. The server engine receives requests for resources (e.g., web pages) via the Internet and coordinates the generation and transmission of the resources. The locate external transactions component collects transaction information relating to various items that are provided by the other server computers. The locate external transactions component stores the transaction information in the external transaction database. The item database contains a description of the items that are available for sale by the server computer. The item database may also contain a hierarchical categorization of items. This hierarchical categorization may be used to categorize items in all types of commercial transactions. The auction database contains information describing the various auctions that are controlled by the server computer. The external transaction database contains information describing commercial transactions for items at other server computers.

One skilled in the art would appreciate that the concepts of the present invention can be used in various environments other than the Internet. For example, the concepts can also be in an electronic mail environment in which an electronic mail message may describe a commercial transaction and advertise related commercial transactions or may integrate the descriptions of various same-item, fungible-item, or related-item commercial transactions. Also, various communication channels may be used such as local area network, wide area network, or point-to-point dial up connection. The commercial transactions may also be conducted entirely within a single computer environment rather than in a client/server environment. Also, a server system may comprise any combination of hardware or software that can support these concepts. In particular, a web server may actually include many computers. A client system may comprise any combination of hardware or software that can interact with the server system. These systems include television-based systems or various other consumer products through which commercial transactions can be conducted.

Figure 6:
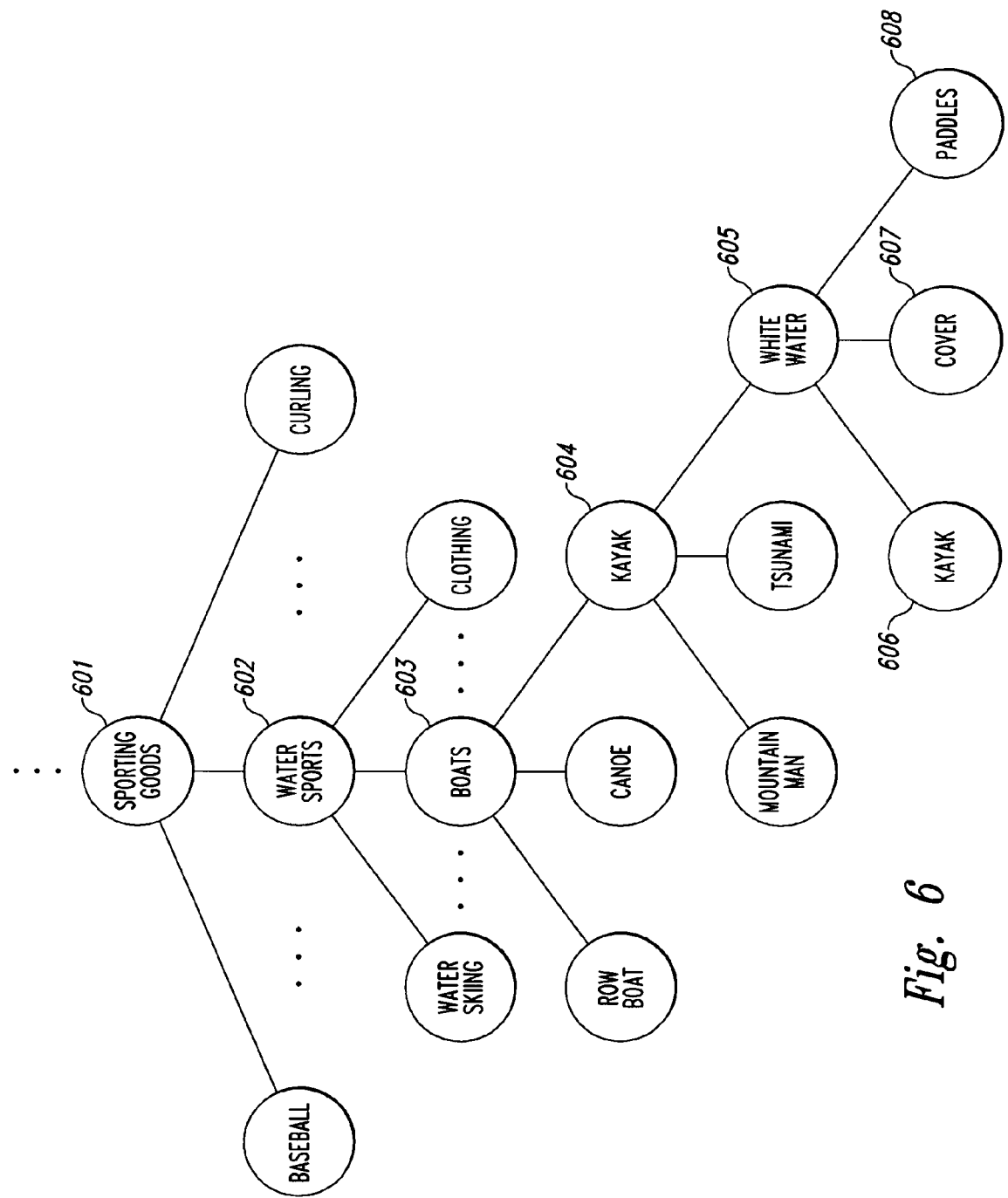
FIG. 6 is a diagram illustrating a hierarchical organization of items.

FIG. 6 is a diagram illustrating a hierarchical organization of items. In this example, the hierarchy is shown starting with a sporting goods category. The sporting goods category 601 contains baseball, water sports, and curling sub-categories. The water sports category 602 contains water skiing, boats, and clothing sub-categories. The boats category 603 includes row boat, canoe, and kayak sub-categories. The kayak category 604 includes sub-categories for various manufacturers. The Whitewater category 605 includes kayak, cover, and paddles sub-categories. The items of the various types of commercial transactions can be categorized according to this hierarchy. The e-commerce system may also allow items to be categorized in multiple categories. For example, a certain baseball (e.g., signed by Babe Ruth) may be categorized under both a sporting goods category and under a collectible category. Thus, the categorization of the item may not be strictly hierarchical.

FIG. 7 is a diagram illustrating a example table containing information describing various items that are for sale. This table may be part of the item database. In this example, a boat table 700 contains an entry for each type of boat that is for sale. Each entry contains a boat type, manufacturer, description, item ID, keywords, price, and similarity fields. The boat type field contains an indication of the type of the boat (e.g., kayak). The manufacturer field contains the name of the manufacturer of the boat (e.g., Whitewater). The description field contains a textual description of the boat that is suitable for displaying to a purchaser. The item ID field contains a unique identifier for the boat (e.g., SKU). The keywords field contains a list of keywords associated with the boat. The price field contains the price of the boat. The similarity field contains the identifiers of items with a high similarity. For example, buyers of Whitewater kayaks may have also bought Whitewater kayak covers, or a certain type of car rack. If so, the similarity field might contain the identifiers of the cover and the car rack. The concept of similarity is described in more detail in U.S. patent application Ser. No. 09/157,198, entitled "Collaborative Recommendations Using Item-to-Item Similarity Mappings," which is hereby incorporated by reference.

Figure 8:
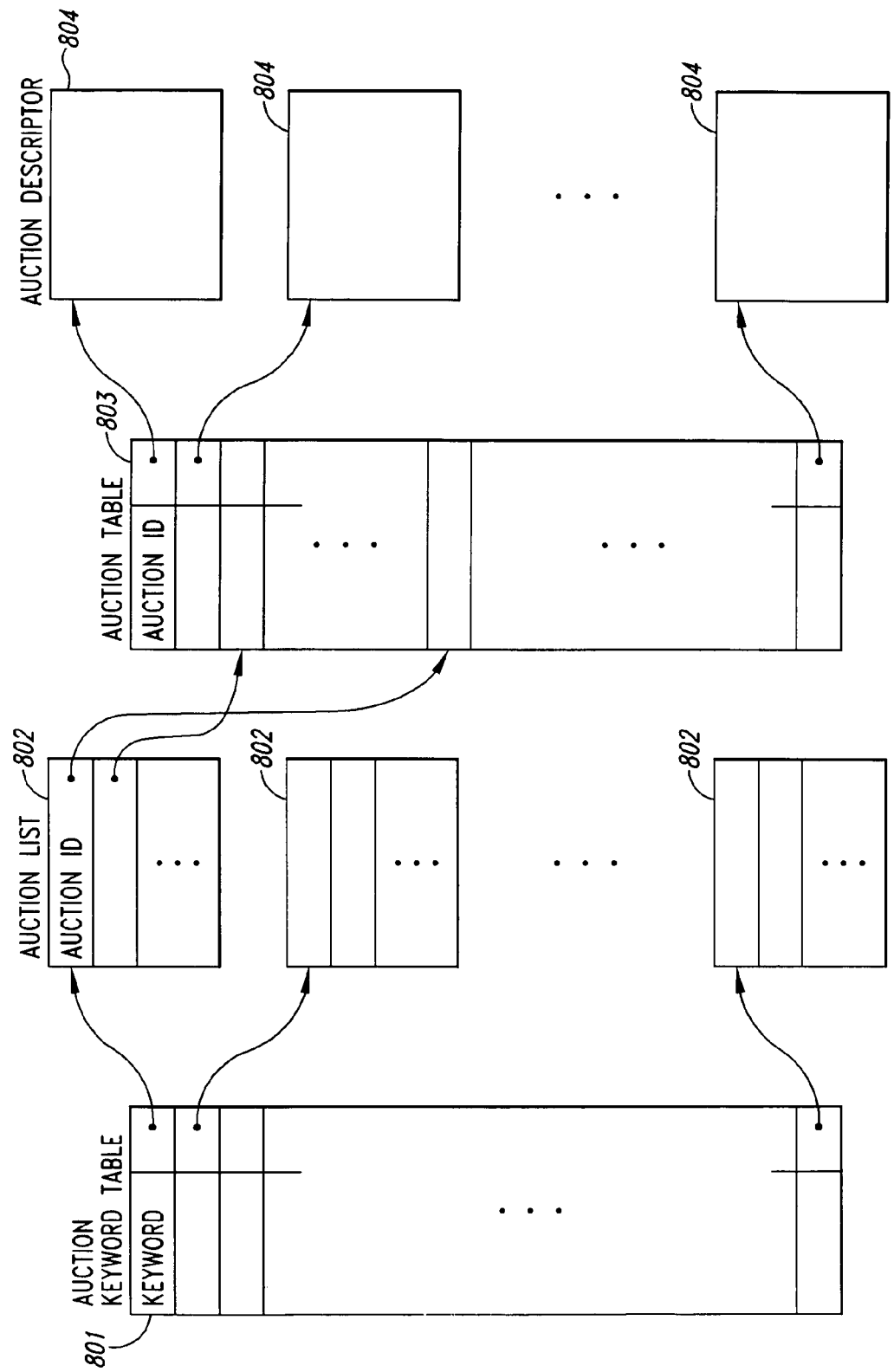
FIG. 8 is a block diagram illustrating the data structures of the e-commerce system used to support the locating of auctions related to an item to be sold based on keywords.

FIG. 8 is a block diagram illustrating the data structures of the e-commerce system used to support the locating of auctions related to an item to be sold based on keywords. The data structures include an auction keyword table 801, auction lists 802, an auction table 803, and auction descriptors 804. The auction keyword table contains an entry for each keyword that has been entered by a seller in the keyword field (see FIG. 3) when creating an auction. Each entry in the auction keyword table contains the keyword along with a pointer to an auction list that lists the auction IDs of the auctions that specified that keyword. The auction table contains an entry for each auction. Each entry contains the auction ID along with a reference to an auction descriptor that provides detailed information on the auction. When finding auctions that relate to an item, the e-commerce system uses the keywords associated with that item (e.g., from the item database) to locate auctions that specify the same keyword. The e-commerce can then add links for those auctions that are still in progress to a purchase web page for the item. One skilled in the art would appreciate that other data structure organizations can be used to support such locating of auctions.

Figure 9:
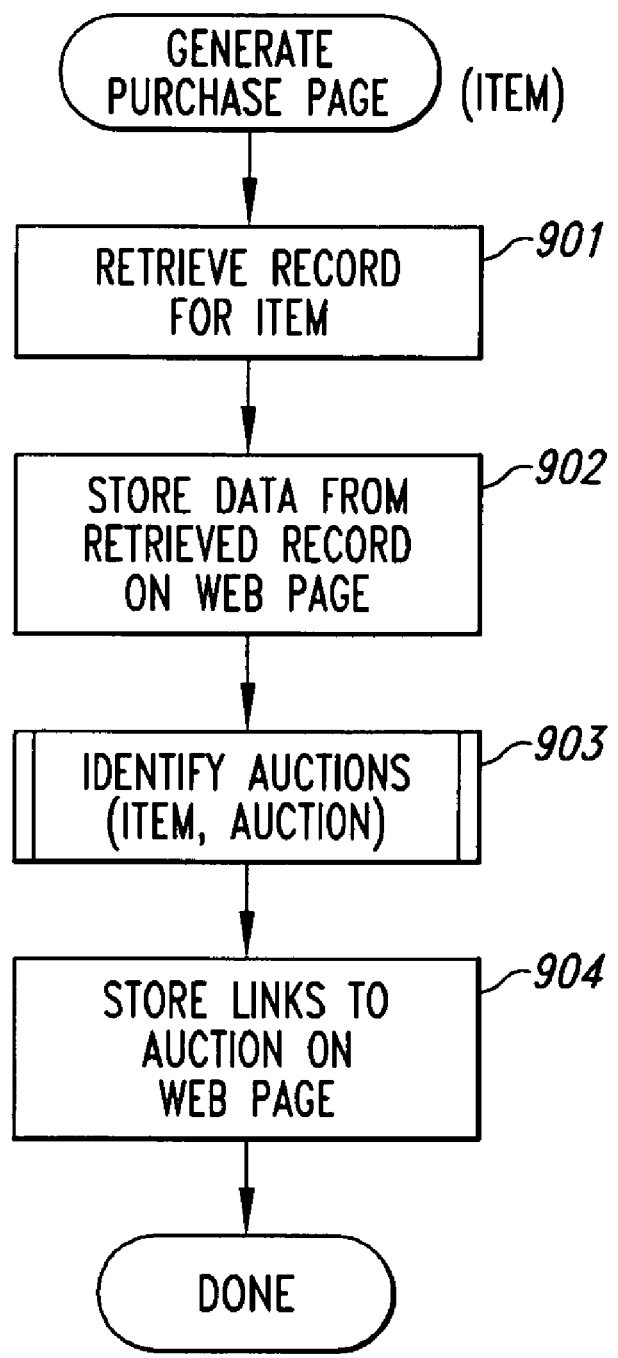
FIG. 9 is a flow diagram of an example implementation of a Generate_Purchase_Page routine.

FIGS. 9–13 are flow diagrams of example implementations of various components of the e-commerce system. FIG. 9 is a flow diagram of an example implementation of a Generate_Purchase_Page routine. This routine is an implementation of the generate purchase page component. This routine generates a purchase web page for the passed item (identified by an item ID) that includes links to related auctions. One skilled in the art would appreciate that the techniques of this routine can be used to generate displayed output or a description of a display using various techniques other than HTML. In a step 901, the routine retrieves the record for the item from the item database. In step 902, the routine adds the data from the retrieved record to the purchase web page. The added data includes the name, the description, and the price of the item. In step 903, the routine invokes the Identify_Auctions routine passing the item and receiving in return a list of links to related auctions. In step 904, the routine stores the links to the auctions on the purchase web page and is done generating the purchase web page. One skilled in the art would appreciate that links to other types of commercial transactions that are internal (i.e., supported by the same server) or external (i.e., supported by another server) may also be added.

Figure 10:
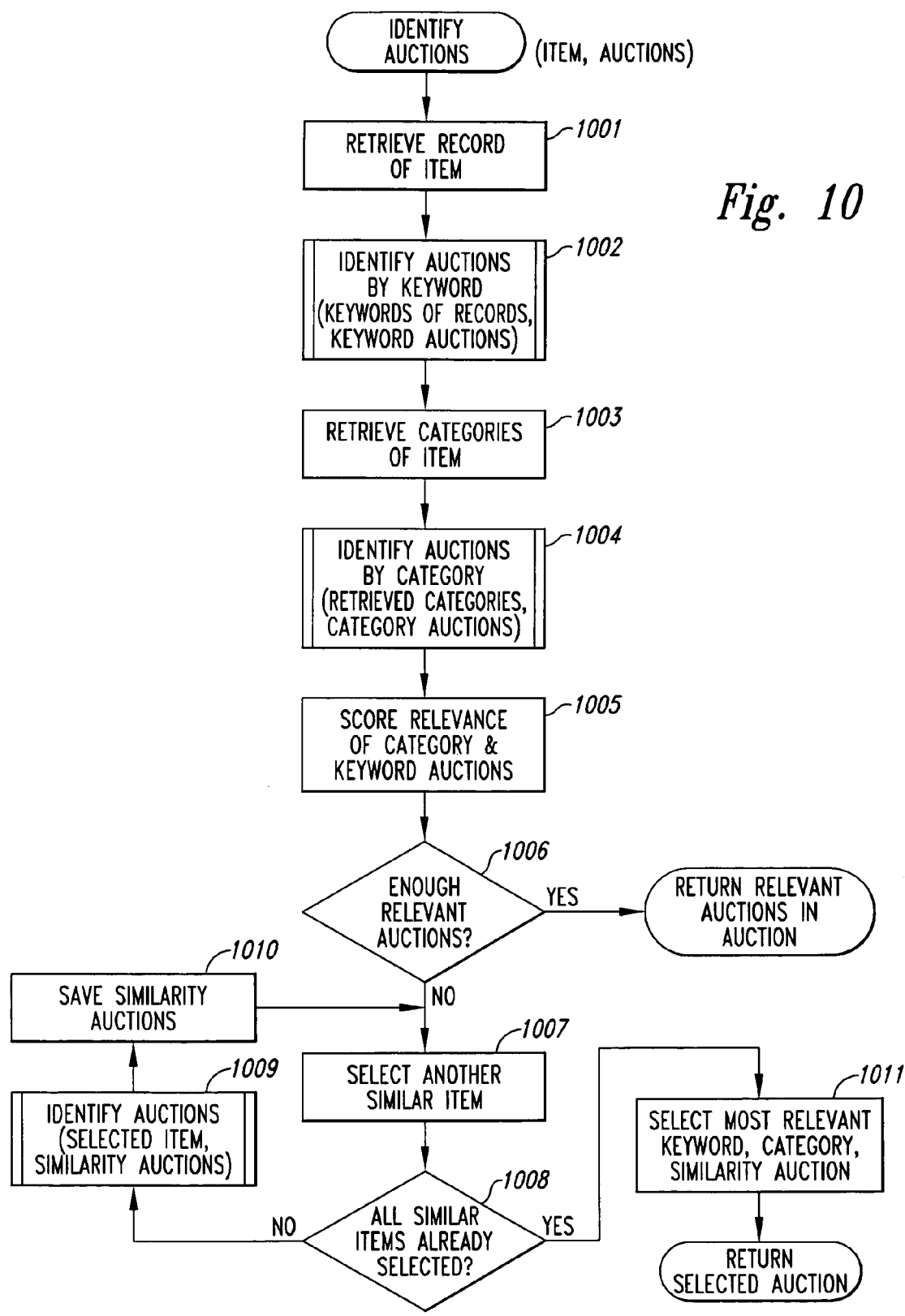
FIG. 10 is a flow diagram of an example implementation of the Identify_Auctions routine.

FIG. 10 is a flow diagram of an example implementation of the Identify_Auctions routine. This routine is passed an item ID and returns a list of links to related auctions. In step 1001, the routine retrieves the record for the item from the item database. In step 1002, the routine invokes the Identify_Auctions_By_Keyword routine passing the keywords of the retrieved record and receiving in return a list of links to or identifiers of auctions that are related to the keywords. In step 1003, the routine retrieves the categories of the item (e.g., boats for a kayak). In step 1004, the routine invokes the Identified_Auctions_By_Category routine passing the retrieved categories and receiving links to or identifiers of auctions that are related to the retrieved categories. In step 1005, the routine scores the relatedness of the auctions that are related to the categories and keywords. Various metrics can be used to score the relatedness. For example, the routine can score the relatedness of auctions based on the hierarchical categorization of the item being auctioned to the passed item or based on the amount of keyword matches. In step 1006, if enough related auctions have been identified, then the routine returns links to those related auctions, else the routine continues at step 1007. In steps 1007–1010, the routine loops identifying auctions that relate to similar items. In step 1007, the routine selects another similar item. The similar items may be stored in the record for the item (e.g., FIG. 7) or may be stored in separate tables. In step 1008, if all the items have already been selected, then the routine continues at step 1011, else the routine continues at step 1009. In step 1009, the routine recursively invokes the Identify_Auctions routine passing the selected similar item and receiving in return a list of links to related auctions. In step 1010, the routine saves the returned links to the auctions and loops to step 1007 to select another similar item. In step 1012, the routine selects the most related auctions that had been identified by keywords, categories, or similarity. The routine then returns links to those selected auctions. One skilled in the art will appreciate that the auctions can be identified by any combination of keyword, category, similarity or by some other technique.

Figure 11:
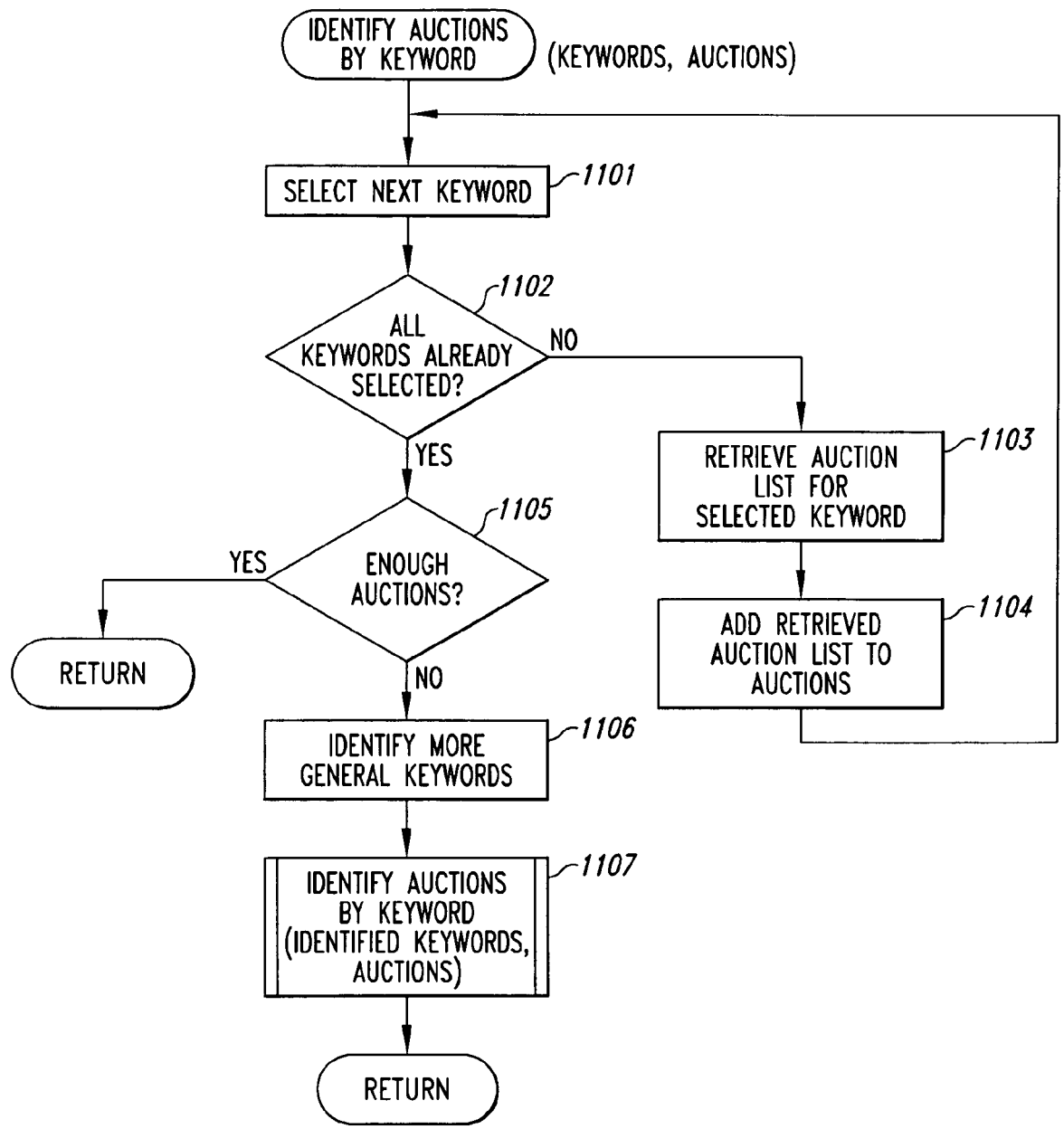
FIG. 11 is a flow diagram of an example implementation of the Identify_Auction_By_Keywords routine.

FIG. 11 is a flow diagram of an example implementation of the Identify_Auction_By_Keywords routine. This routine is passed a list of keywords and returns links to or identifiers of related auctions. In steps 1101–1104, the routine loops selecting each passed keyword and identifying auctions that relate to the selected keyword. In step 1101, the routine selects the next passed keyword. In step 1102, if all the passed keywords have already been selected, then the routine continues at step 1105, else the routine continues at step 1103. In step 1103, the routine retrieves the auction list for the selected keyword by accessing the auction keyword table. In step 1104, the routine adds the auctions in the retrieved auction list to the auction to be returned. The routine then loops to step 1101 to select the next passed keyword. In step 1105, if enough auctions have already been identified, then the routine returns, else the routine continues at step 1106. In step 1106, the routine identifies more general keywords. For example, if a keyword is "canoe," then a more general keyword is "boat." In step 1107, the routine recursively invokes the Identify_Auctions_By_Keywords routine passing the identified more general keywords and receiving a list of auctions in return. The routine then returns. One skilled in the art will appreciate that the recursive invocations can be terminated at a certain level of recursion if not enough auctions have been identified and that the techniques of the present invention can be implemented without recursion.

Figure 12:
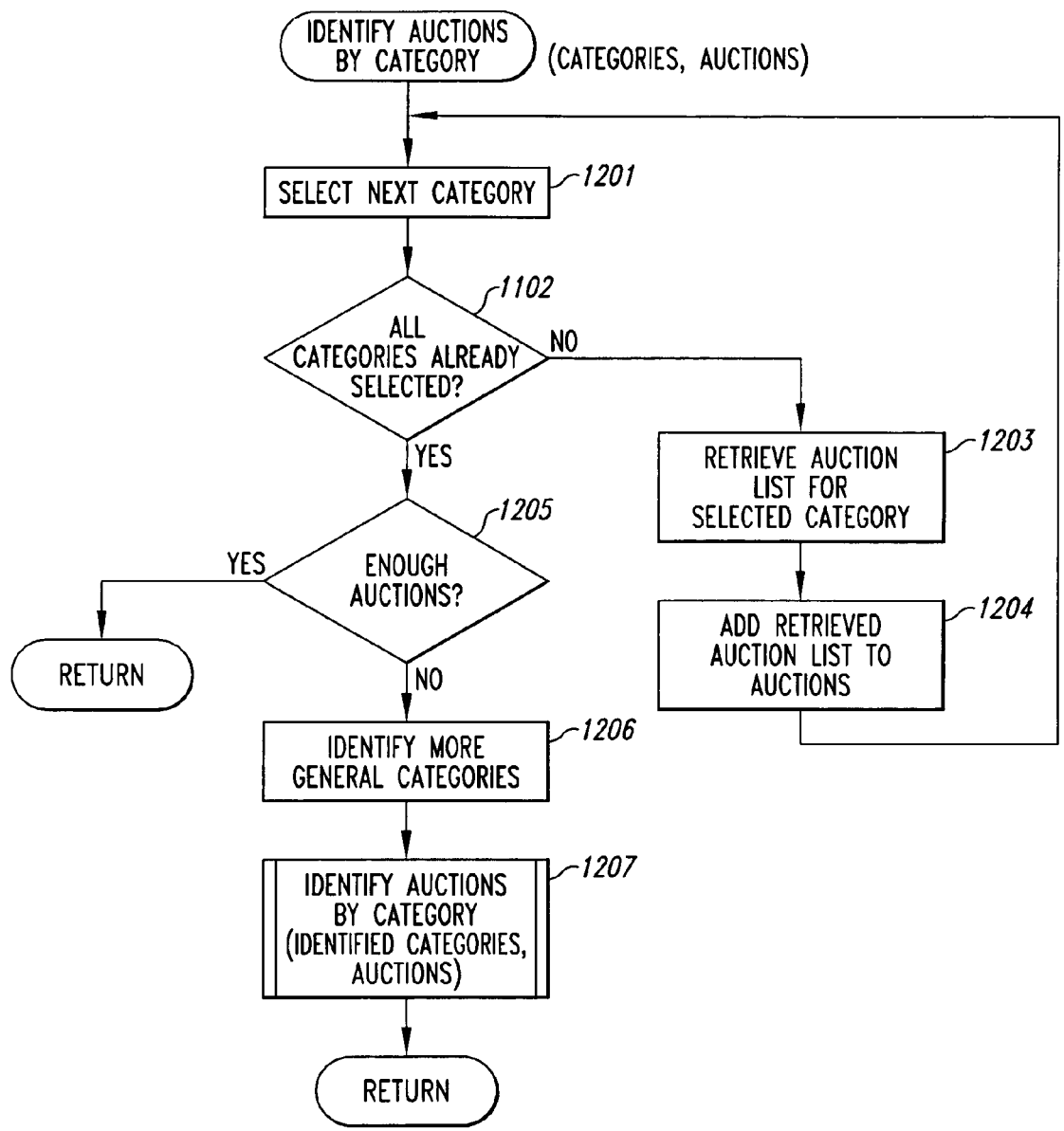
FIG. 12 is a flow diagram of an example implementation of the Identify_Auctions_By_Category routine.

FIG. 12 is a flow diagram of an example implementation of the Identify_Auctions_By_Category routine. This routine is passed a list of categories and returns links to or identifiers of related auctions. In steps 1201–1204, the routine loops selecting each passed category and identifying the auctions that relate to the selected category. In step 1201, the routine selects the next passed category. In step 1202, if all the passed categories have already been selected, then the routine continues at step 1205, else the routine continues at step 1203. In step 1203, the routine retrieves the auction list for the selected categories. The categories may be cross-referenced to the auctions using data structures analogous to the data structure used for the keywords as shown in FIG. 8. In step 1204, the routine adds the retrieved auction list to the auctions to be returned. The routine then loops to step 1201 to select the next category. In step 1205, if enough auctions have already been identified, then the routine returns, else the routine continues at step 1206. In step 1206, the routine identifies more general categories. For example, if the category is canoe, then a more general category may be boat. In step 1207, the routine recursively invokes the Identify_Auctions_By_Categories routine passing the identified more general categories and receiving a list of auctions in return. The routine then returns.

Figure 13:
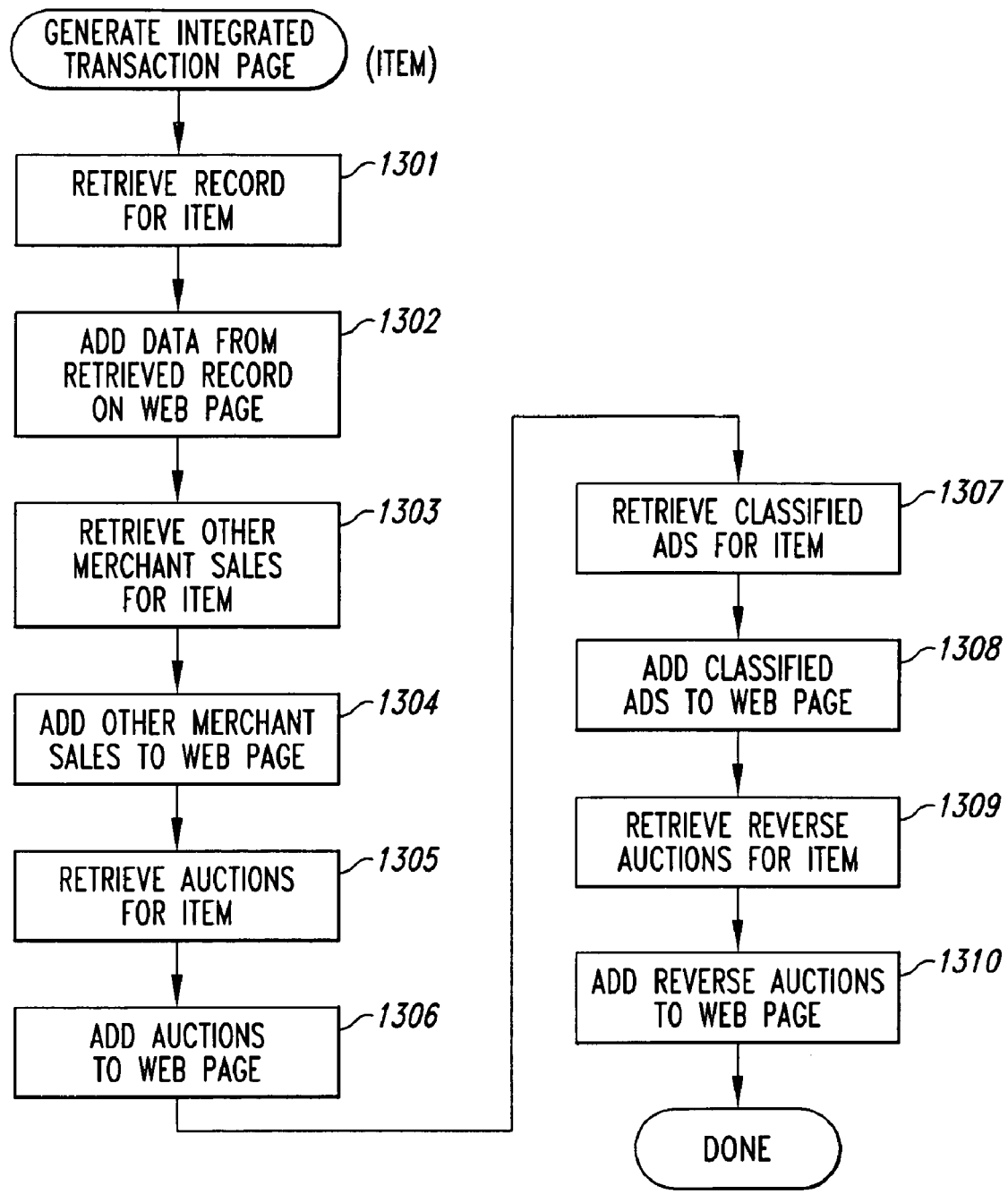
FIG. 13 is a flow diagram of an example implementation of a Generate_Integrated_Page routine.

FIG. 13 is a flow diagram of an example implementation of a Generate_Integrated_Page routine. This routine retrieves the various transactions (internal and external) for the passed item and generates an integrated web page with links for each of the transactions. This routine is an example implementation of the generate integrated page component. In step 1301, the routine retrieves the record from the item database for the passed item. In step 1302, the routine adds data from the retrieved record to the web page. This data includes the name, description and price of the item. This, of course, assumes that the item is being offered for sale through the server of the e-commerce system. In one embodiment, the e-commerce system may not even conduct any commercial transactions itself. Rather, the e-commerce system may publicize commercial transactions that are conducted by other server computers. In step 1303, the routine retrieves information describing external purchase transactions for the passed item from the external transaction database. In step 1304, the routine adds a description of the retrieved external purchase transactions to the integrated web page. In step 1305, the routine retrieves information describing auctions for the passed item from the external transaction database and from the auction table. In step 1306, the routine adds the retrieved auction information to the integrated web page. In the step 1307, the routine retrieves information describing wanted-item transactions for the passed item from the external transaction database and from any internal wanted-item databases. In step 1308, the routine adds the wanted-item information to the integrated web page. In step 1309, the routine retrieves reverse auction information for the passed item from the external transaction database or any internal reverse auction database. In step 1310, the routine adds reverse auction information to the integrated web page and then completes.

From the foregoing it will be appreciated that, although specific embodiments of the invention have been described herein for purposes of illustration, various modifications may be made without deviating from the spirit and scope of the invention. For example, various prioritizing techniques can be used to decide which related commercial transactions should be advertised. The e-commerce system may give preference to commercial transactions based on amount of advertising fee paid by the user who sets up the commercial transaction. The e-commerce system may also give preference based on amount of commission that would be paid if the commercial transaction is completed. Alternatively, the e-commerce system may randomly select commercial transactions to related items or ensure that each such commercial transaction is given an approximately equal amount of advertising. Accordingly, the invention is not limited except as by the appended claims.

The invention claimed is:

1. A method in a computer system for publicizing commercial transactions, the method comprising:
receiving by the computer system a selection of a purchase transaction for a first item;
identifying by the computer system an auction for a second item that is related to the first item; and
generating by the computer system a display description that includes information for conducting the purchase transaction for the first item and that includes information relating to the identified auction for the second item so that a user who may view information relating to a purchase transaction for the first item can view information relating to the identified auction for the second item.

2. The method of claim 1 including sending by the computer system the generated display description to a client computer.

3. The method of claim 1 wherein the generated display description is a web page.

4. The method of claim 1 wherein the information relating to the identified auction is a link to a web page for the identified auction for the second item.

5. The method of claim 1 wherein the generating of the display description includes storing by the computer system words describing the identified auction so that the identified auction for related items can be located.

6. The method of claim 5 wherein the stored words are keywords.

7. The method of claim 1 wherein the identifying of the auction is based on a category of the first item and a category of the second item.

8. The method of claim 1 wherein the first item and the second item are the same type of item.

9. The method of claim 1 wherein the first item and second item are fungible items.

10. The method of claim 1 wherein when not enough auctions have been identified for related items, using an expanded definition of a related item.

11. The method of claim 1 wherein the identifying of the auction is based on information received for the auction.

12. The method of claim 11 wherein the information received is a unique identifier of the first item.

13. The method of claim 11 wherein the information received is a category of the first item.

14. The method of claim 11 wherein the information received is a keyword.

15. A method in a computer system for generating a display description of commercial transactions, the method comprising:
receiving by the computer system a request to identify commercial transactions relating to a selected item;
retrieving by the computer system information describing a purchase transaction for an item that is related to the selected item and that is for sale;
retrieving by the computer system information describing an auction for an item that is related to the selected item and that is being auctioned; and
generating by the computer system a display description that includes retrieved information describing the purchase transaction for the item that is for sale and retrieved information describing the auction for the item that is being auctioned so that information relating to both a purchase transaction and an auction can be provided to a user.

16. The method of claim 15 wherein the generated display description results in displaying the retrieved information describing the purchase transaction and the auction simultaneously.

17. The method of claim 15 including sending by the computer system the generated display description to a client computer.

18. The method of claim 15 wherein the generated display description is a web page.

19. The method of claim 15 wherein the retrieved information includes a link to a web page.

20. The method of claim 15 wherein the received request includes a unique identifier of an item and the purchase transaction and the auction are for items with that unique identifier.

21. The method of claim 15 wherein the received request includes a category of items and the purchase transaction and the auction are for items in that category.

22. The method of claim 15 wherein the received request includes a category of items and the purchase transaction and the auction are for items in related categories.

23. The method of claim 15 wherein the auction is selected based on information that associates the auction with the item for sale.

24. The method of claim 23 wherein the information associated with the auction is cross advertising information.

25. The method of claim 23 wherein the information associated with the auction is a unique identifier of the item for sale.

26. The method of claim 23 wherein the information associated with the auction is a category of items.

27. A method in a computer system for identifying auctions to recommend to a user, the method comprising:
analyzing by the computer system access patterns of the user to information describing items that are for sale for a fixed price;
identifying by the computer system items that may be of interest to the user based on the analysis of the access pattern; and
identifying by the computer system auctions that are related to those identified items so that the identified auctions can be recommended to the user.

28. The method of claim 27 wherein the access patterns include purchases of the items at a fixed sale price.

29. The method of claim 27 wherein the access patterns include viewing web pages describing the items.

30. A method in a computer system for specifying cross advertising information for an auction, the method comprising:
receiving by the computer system from a user an identification of an auction for an item;
receiving by the computer system from the user information that identifies items with which the auction is to be cross-advertised; and
storing by the computer system the received information so that when a purchase transaction for the item is conducted the identified auction can be advertised as the purchase transaction is being conducted.

31. The method of claim 30 wherein the receiving from the user the identification of an auction for the item includes establishing by the computer system the auction for the item.

32. The method of claim 30 wherein the received information includes a unique identifier of an item with which the item is to be cross-advertised.

33. The method of claim 32 including ensuring that reasonableness of advertising the auction with the identified item.

34. The method of claim 30 wherein the received information includes a category of items with which the item is to be cross-advertised.

35. The method of claim 30 wherein the received information includes a keyword associated with items with which the item is to be cross-advertised.

36. A computer-readable medium containing instructions for causing a computer system to cross-advertise an auction with an item that is for sale, by receiving by the computer system a request to display information relating to the item that is for sale;
upon receiving the request, determining by the computer system whether a user has specified to advertise an auction with the item that is for sale; and
when it is determined that a user has specified to advertise an auction with the item that is for sale, generating by the computer system a display description that includes information relating to the item that is for sale and an indication of the auction.

37. The computer-readable medium of claim 36 wherein the indication of the auction includes a link to a web page for the auction.

38. The computer-readable medium of claim 36 wherein the indication of the auction includes a link a web page that contains a link to a web page for the auction.

39. The computer-readable medium of claim 36 wherein the user specified to advertise the auction with the item that is for sale by providing a unique identifier of the item.

40. The computer-readable medium of claim 36 wherein the user specified to advertise the auction with the item that is for sale by providing a category of the item.

41. The computer-readable medium of claim 36 wherein the user specified to advertise the auction with the item that is for sale by providing a keyword relating to the item.

42. A method in a computer system for publicizing commercial transactions on a web page, the method comprising:
displaying by the computer system to a user an indication of multiple purchase transactions, each purchase transaction relating to an item;
receiving by the computer system from the user a selection of a purchase transaction for a first item, the selection made from the multiple purchase transactions of the displayed indication;

in response to the received selection, identifying by the computer system an auction for a second item that is related to the first item; and generating by the computer system a display description that includes information for conducting the purchase transaction for the first item and that includes information relating to the identified auction for the second item so that the user may view information relating to the purchase transaction for the first item and view information relating to the identified auction for the second item.

43. A method in a computer system for publicizing commercial transactions on a web page, the method comprising:

receiving by the computer system from a seller an identification of an auction for a first item;

receiving by the computer system from the seller information that identifies a second item with which the auction is to be cross-advertised;

storing by the computer system the received information;

receiving by the computer system from a purchaser a selection of a purchase transaction related to the second item; and retrieving by the computer system the stored information and generating a display description that includes information relating to the purchase transaction for the second item and information relating to the auction for the first item so that the information relating to the auction for the first item can be viewed by the purchaser as the purchase transaction for the second item is conducted.

* * * * *